US007140108B2

(12) United States Patent
Kobayashi et al.

(10) Patent No.: US 7,140,108 B2
(45) Date of Patent: Nov. 28, 2006

(54) METHOD OF DESIGNING DEVICE

(75) Inventors: Kenji Kobayashi, Wako (JP); Daisuke Susa, Wako (JP); Kotaro Shige, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 792 days.

(21) Appl. No.: 10/362,705
(22) PCT Filed: May 29, 2001
(86) PCT No.: PCT/JP01/04486

§ 371 (c)(1),
(2), (4) Date: Feb. 25, 2003

(87) PCT Pub. No.: WO02/18197

PCT Pub. Date: Mar. 7, 2002

(65) Prior Publication Data

US 2004/0250395 A1 Dec. 16, 2004

(30) Foreign Application Priority Data

Aug. 30, 2000 (JP) ............................. 2000-260733

(51) Int. Cl.
*B21D 53/88* (2006.01)
*B30B 9/32* (2006.01)
(52) U.S. Cl. .................. 29/897.2; 29/403.2; 29/403.4; 29/403.3
(58) Field of Classification Search ............... 29/897.2, 29/403.1, 403.2, 403.3, 403.4; 241/24.12, 241/24.25, 24.28
See application file for complete search history.

(56) References Cited

U.S. PATENT DOCUMENTS 5,077,885 A * 1/1992 Kanemitsu et al. ........... 29/430

(Continued)

FOREIGN PATENT DOCUMENTS

| DE | 41 43 251 | 9/1992 |
| JP | 9060619 | 3/1997 |
| JP | 11091661 | 4/1999 |

(Continued)

OTHER PUBLICATIONS

Farrington et al., "Designing for recycling", *Automotive Engineering, Society of Automotive Engineers*: Aug. 1997; pp. 46-48.

(Continued)

*Primary Examiner*—Marc Jimenez
(74) *Attorney, Agent, or Firm*—Hamre, Schumann, Mueller & Larson, PC

(57) ABSTRACT

Provided is a method of designing a device, comprising the steps of determining a disposing process for each component of the device, the disposing process being selectable from a melting process, a shredding process and a renovating process, and designing a connecting part for joining two of the components of the device that would be determined to be disposed by different disposing processes in the determining step so as to be easily separated from each other. Thereby, the amount of work for dismantling the device and separating the components can be substantially reduced, and the component parts can be disposed simultaneously in most part.

1 Claim, 17 Drawing Sheets

U.S. PATENT DOCUMENTS

| | | | |
|---|---|---|---|
| 5,121,534 A * | 6/1992 | Kruzich | 29/407.01 |
| 5,311,659 A * | 5/1994 | Barnhart et al. | 29/823 |
| 5,584,503 A * | 12/1996 | Lutz | 280/731 |
| 5,660,428 A | 8/1997 | Catlin | |
| 5,819,408 A * | 10/1998 | Catlin | 29/897.2 |
| 6,210,613 B1 * | 4/2001 | Stein et al. | 264/45.4 |
| 6,710,133 B1 * | 3/2004 | Gebreselassie et al. | 525/240 |
| 6,861,019 B1 * | 3/2005 | Ali et al. | 264/46.4 |

FOREIGN PATENT DOCUMENTS

| | | |
|---|---|---|
| JP | 11348855 | 12/1999 |
| JP | 2000037685 | 2/2000 |

OTHER PUBLICATIONS

European Search Report for European Application No. 01 93 2314 dated Jul. 15, 2004; 2 pages.

European Examination Report for European Application No. 01 93 2314 dated Mar. 7, 2006; 3 pages.

\* cited by examiner

# METHOD OF DESIGNING DEVICE

TECHNICAL FIELD

The present invention relates to a method of designing devices, and in particular to a method of designing devices that allows the material thereof to be recycled in a favorable fashion.

BACKGROUND OF THE INVENTION

Japanese patent laid open (kokai) publication No. 11-348855 discloses a method of recycling discarded automobiles by transporting each automobile with a loop-type carrier suspended from a hanger, removing components from the automobile while the automobile is transported among different work stations at low speed, sorting the components into those that can be recycled and those that cannot be recycled, storing them in corresponding bins, and pressing and shredding those that cannot be recycled.

However, considerations for recycling are mostly absent in the presently adopted vehicle structures. For instance, components are often made by inseparably combining different materials such as metallic material and plastic material. Therefore, when disposing an automobile, the weight of the waste material that cannot be recycled and is required to be disposed of by landfill or the like typically amounts to about 25% of that of the automobile itself.

The method proposed in the aforementioned Japanese patent publication is no more than an introduction of a flow process into the work of disassembling discarded automobiles in place of pure manual work, and failed to meet the social need to more efficiently utilize resources and reduce waste material.

BRIEF SUMMARY OF THE INVENTION

In view of such problems of the prior art, a primary object of the present invention is to provide a method of designing devices that allows larger parts of the components to be recycled as useful resources.

To achieve such an object, the present invention provides a method of designing a device, comprising the steps of: determining a disposing process for each component of the device, the disposing process being selectable from a melting process, a shredding process and a renovating process; and designing a connecting part for joining two of the components of the device that would be determined to be disposed by different disposing processes in the determining step so as to allow them to be easily separated from each other. Thereby, the amount of work for dismantling the device and separating and sorting the components can be substantially reduced, and the component parts can be disposed simultaneously in most part.

It is desirable if the method further comprises the step of forming a module with a plurality of components so as to allow the components to be removed from the vehicle body simultaneously as a single module. Thereby, the small components are not required to be removed from narrow spaces in the engine room or the like, and the work efficiency of dismantling the device is improved.

It is preferable if the method comprises the step of selecting the material for individual components such that a component or components that are to be disposed jointly consist of a single material. For instance, because an automotive floor mat conventionally consisted of a polyester surface skin and a PVC back lining which cannot be easily separated from each other, the floor mat was required to be disposed as wholly waste material. However, if these two parts are made of a same material, it becomes easier to recycle the floor mat as a useful resource.

BRIEF DESCRIPTION OF THE DRAWINGS

Now the present invention is described in the following with respect to an application to the disposal of automobiles that cover a wide range of industrial technologies, including mechanical, electric and electronic technologies, with reference to the appended drawings, in which.

DETAILED DESCRIPTION OF THE PREFERRED EMBODIMENTS

In the first step of the design method according to the present invention, it is determined how each component part of the device consisting of an automobile in this case should be processed. The components essentially made of metallic material are assigned to a melting process 1 and heated and melted so as to be separated into aluminum, iron and residues. The components essentially made of plastic material and thin pieces of metal are assigned to a shredding process 2 and shredded into chips so as to be separated into metallic parts and non-metallic parts. The components that are provided with individual functions and can be repaired are assigned to a renovation process 3 and overhauled or otherwise renovated by parts manufacturers. (the processing method determining step.)

Figure 1:
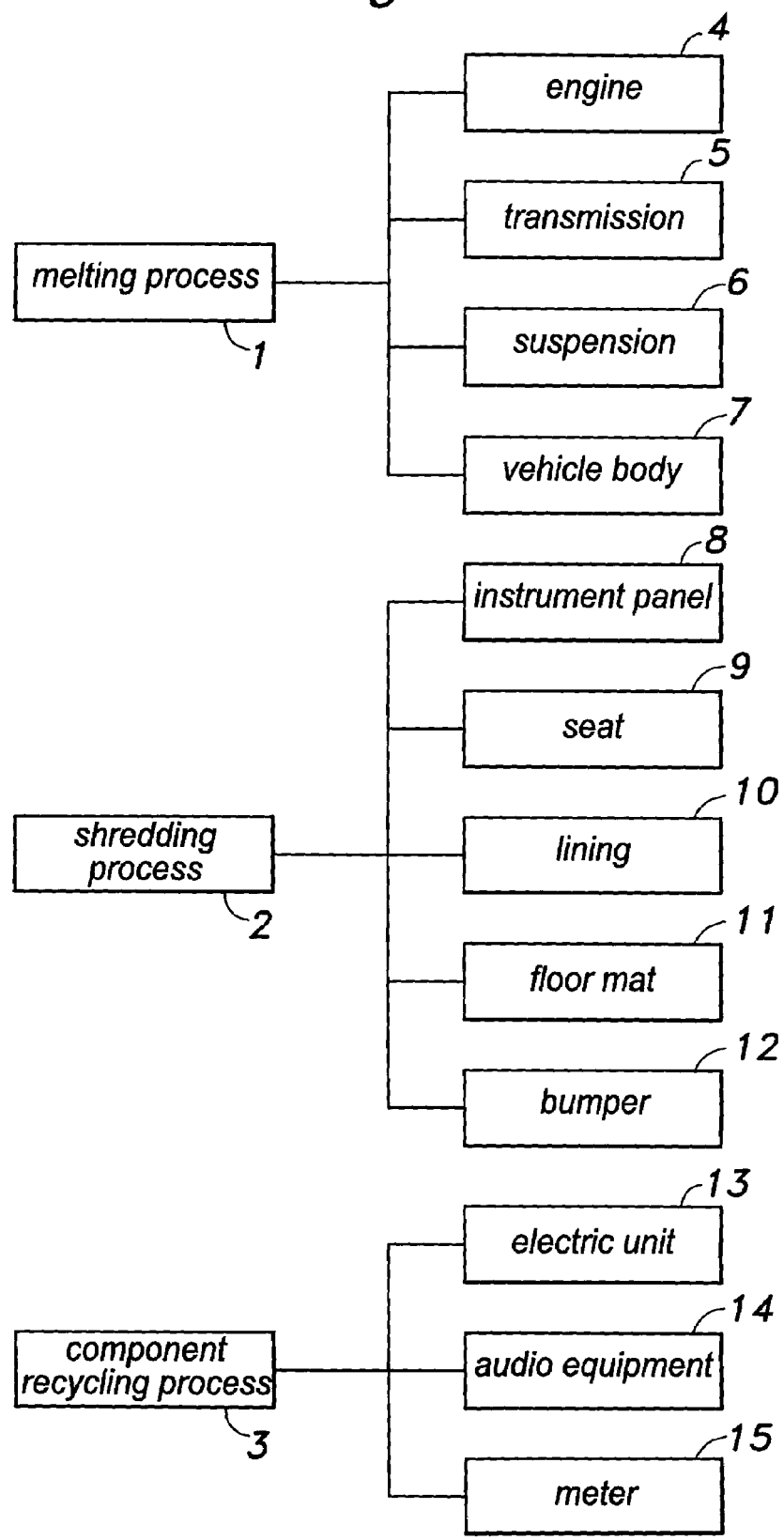
FIG. 1 is a block diagram showing the step of determining the disposal process.

Components such as engines 4, transmissions 5, wheel suspension systems 6 and vehicle bodies 7 that are made of metallic material and destined for the melting process 1 are brought together as a group. Components such as instrument panels 8, seats 9, linings 10, floor mats 11 and bumpers 12 are brought together as another group. Electric equipment 13, audio units 14 and meters 15 that are destined for the renovation process 3 are brought together as yet another group. See FIG. 1.

In the second step, the connecting parts that connect various parts to the vehicle body or to each other are constructed so as to be easily broken apart. (the easily separable structure designing step).

For instance, the instrument panel 8 may be adapted to retain the audio unit 14, the control unit for the air conditioner and various meters 15 each provided with a lock device using a suitable snap fit arrangement that can be readily released. The instrument panel 8 may be adapted to be readily detached from the vehicle body 7 by using a lock mechanism that uses an eccentric cam.

The floor mat 11 may be provided with a readily breakable part extending through the parts joining the seat 9 to the vehicle body 7 so that the floor mat 11 may be removed from the vehicle body 7 by tearing apart the readily breakable parts without requiring the seats to be removed.

The electric components are adapted for flat harnesses and quick couplers so that the cables may be detached without any difficulty.

In the third step, various components are given with a modular structure using a common member for supporting a plurality of components so that the various components may be removed from the vehicle body as a single group and, thereafter, separated into individual components outside the vehicle body. (the modular structure design step.)

Figure 2:
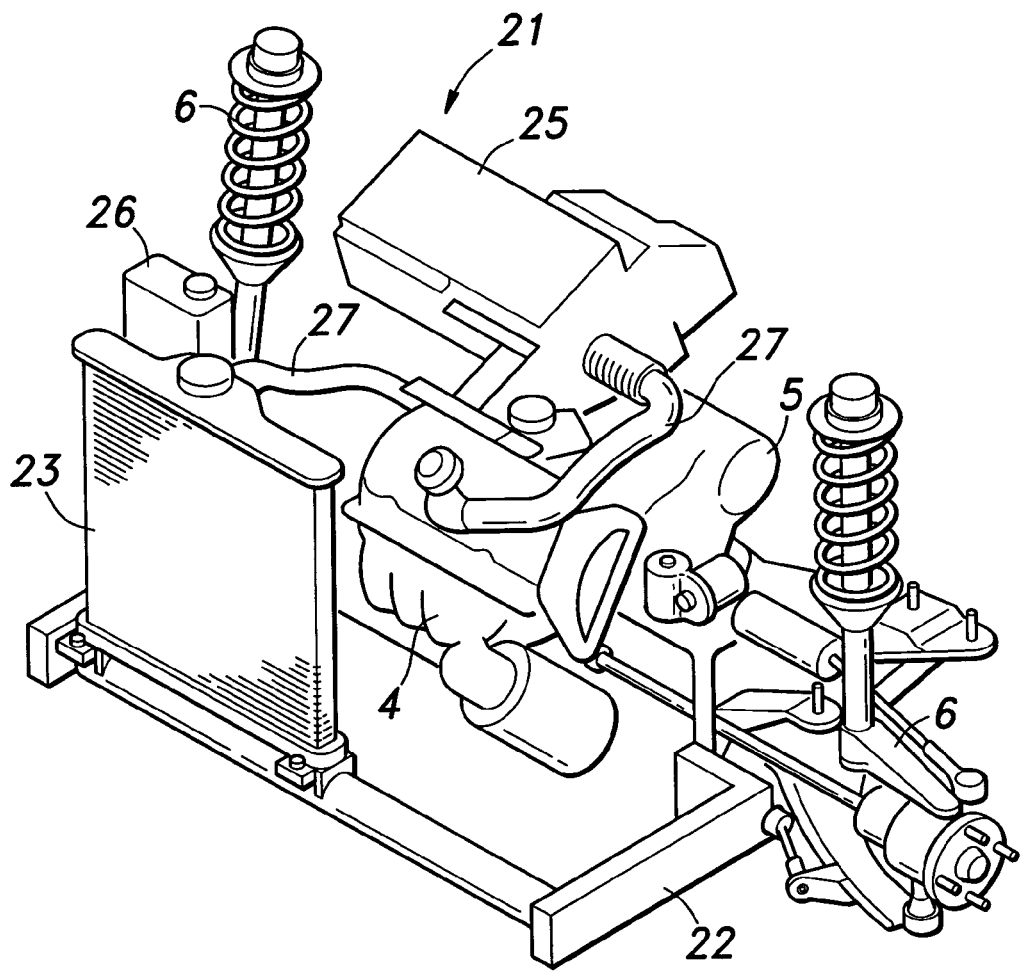
FIG. 2 is a perspective view of an engine module.
Figure 3:
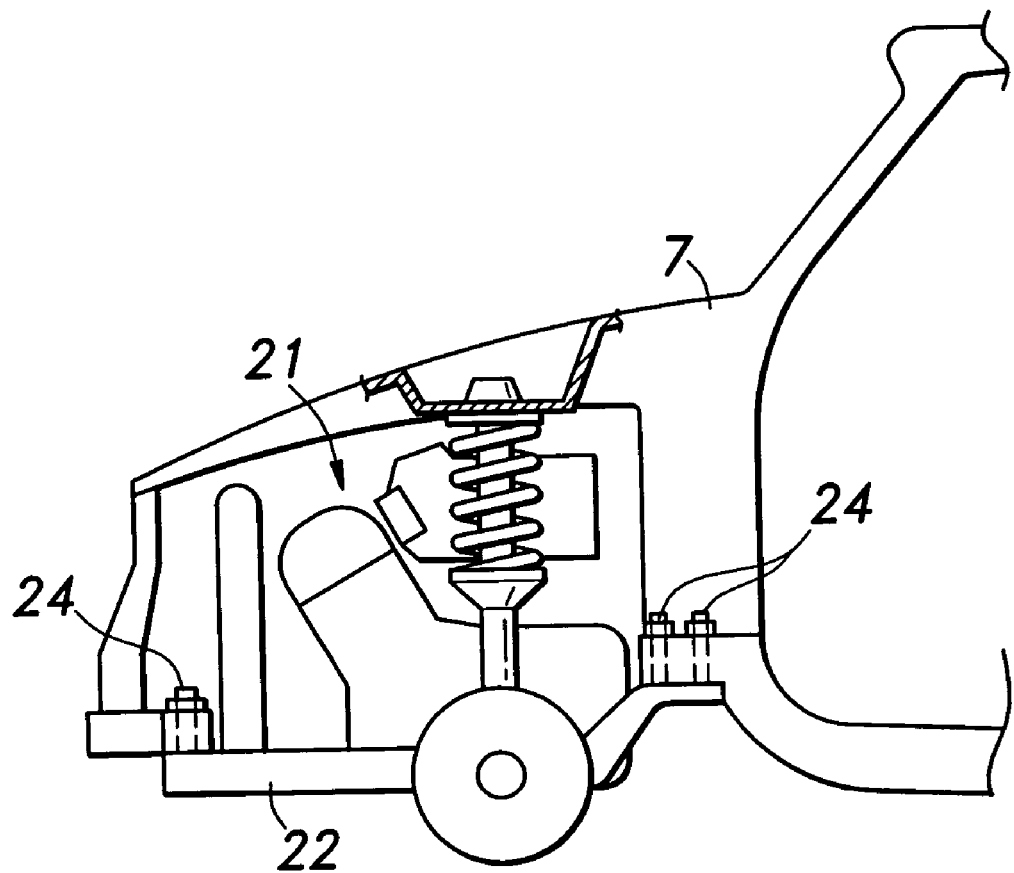
FIG. 3 is a sectional side view showing the relationship between the engine module and vehicle body.

For instance, the engine and related units may be formed as an engine module 21 as illustrated in FIGS. 2 and 3. More specifically, the engine 4 and related units such as the transmission 5, wheel suspension systems 6 and radiator 23 are attached to the vehicle body 7 via a front sub frame 22 forming a part of the vehicle body 7 and attached to the vehicle body 7 by using fastening means suited for repeated use, such as threaded bolts/nuts 24, so that the engine 4 and related units may be removed from the vehicle body 7 simply by separating the front sub frame 22 from the vehicle body 7.

Figure 4:
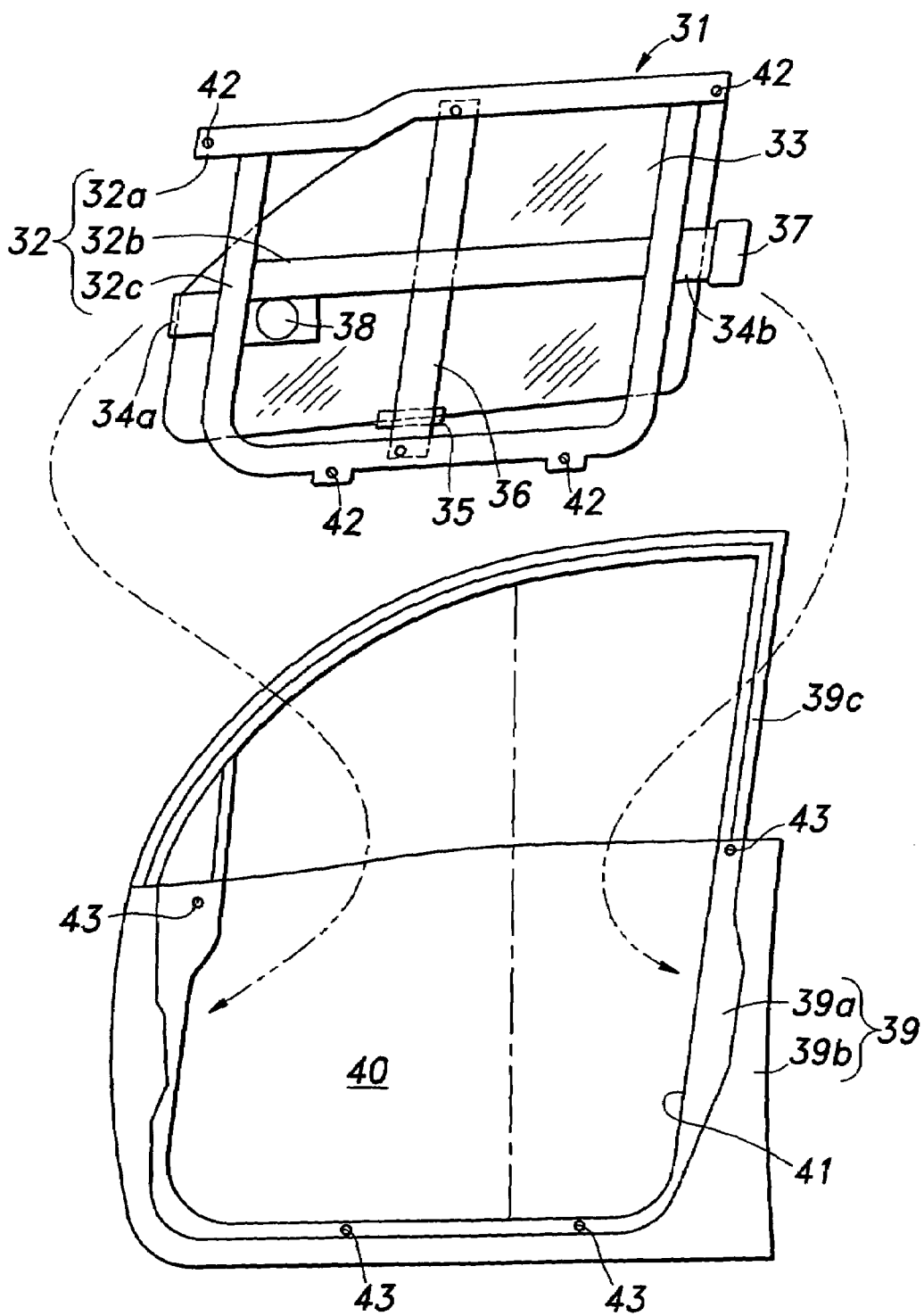
FIG. 4 is a side view showing the relationship between the door module and door as seen from inside the passenger compartment.

The doors may also be formed as door modules as illustrated in FIG. 4. More specifically, the side glass pane 33 and the wind regulator motor 38 are attached to a module frame 32 made of aluminum alloy or the like so that the components that cannot be processed together with the vehicle body 7 can be removed from the door 39 simply by removing the door lining 10 and detaching the module frame 32 from the door 39.

Additionally, as opposed to the conventional practice to construct each component by combining a plurality of different materials without any special considerations, each component is made of a single material as much as possible. (the material selecting step).

For instance, because the conventional floor mat consisted of a back lining made of coarse cotton felt and a surface skin layer made of PET non-woven fabric, it could not be simply removed from the vehicle and turned into pellets. According to the present invention, the back lining and surface skin layer are both made of olefin based material (mono-material) so that the removed floor mat can be readily converted into pellets.

Also, a plurality of components that are made of a same material and/or that are to be processed together are integrally formed with each other. For instance, the cooling water sub tank and window washer fluid tank may be integrally molded with the radiator fan shroud, and the casing for the electronic control unit may be integrally formed with the air cleaner case.

The present invention is now described with respect to specific embodiments with reference to the appended drawings.

Referring to FIGS. 2 and 3, the engine module 21 includes a front sub frame 22 forming a part of the vehicle body 7 and supporting the engine main body 4, transmission 5, wheel suspension system 6 and radiator 23. The front sub frame 22 is fixedly attached to the vehicle body 7 by using threaded bolts/nuts 24 so that the engine main body 4 and related units can be removed from the vehicle body 7 all at the same time simply by detaching the front sub frame 22 from the vehicle body 7. As a result, the dismantling of the engine and related units can be conducted outside the engine room, and this facilitates the removable of electric units 13 such as the alternator, starter motor and wire harnesses and non-metallic components such as an air cleaner 25, washer fluid tank 26 and rubber hoses 27 from the engine main body 4.

Referring to FIG. 4, the door module 31 comprises a module frame 32 consisting of a first frame member 32*a* and a second frame member 32*b* which extend substantially linearly in the fore-and-aft direction parallel to each other as seen from the side, and a substantially U-shaped third frame member 32*c* which are integrally joined to each other by welding. These frame members are, for instance, made of continuously extruded aluminum alloy. The first and second frame members 32*a* and 32*b* are formed by cutting a continuously extruded member into prescribed lengths and the third frame member 32*c* is formed by bending a linear extruded member.

The module frame 32 is provided with guide members 34*a* and 34*b* for guiding the front and rear edges of the side glass pane 33, a support member 35 supporting the lower edge of the side glass pane 33, lock means 37 for locking the door with respect to the vehicle body 7 and a window regulator motor 38.

The door 39 forming a part of the vehicle body 7 and having the module frame 32 fixedly attached thereto comprises a door inner panel 39*a* and a door outer panel 39*b* which are joined to each other by welding. A window frame 39*c* for supporting the side glass pane 33 in its fully closed state is fixedly attached to an upper part of the door 39. The door 39 is provided with a receiving portion 40 between the inner and outer panels 39*a* and 39*b* for receiving the side glass pane 33 therein, and the inner panel 39*a* is provided with an opening 41 for introducing the side glass pane 33 attached to the door module 31 into the receiving portion 40.

The door module 31 and door 39 are attached to each other by registering mounting holes 42 formed in the door module 31 and mounting holes 43 formed in the door inner panel 39*a* to each other and passing plastic clip fasteners (not shown in the drawing) through these mounting holes 42 and 43.

Thus, the door 39 and door module 31 can be readily separated from each other simply by removing the lining 10 (not shown in the drawing) and unfastening the clip fasteners. Once the door module 31 is separated from the door 39, the various components and accessory units such as the side glass pane 33 and window regulator motor 38 can be removed from the door 39 all at the same time, individually and without requiring the worker to take any uncomfortable posture.

Figure 5:
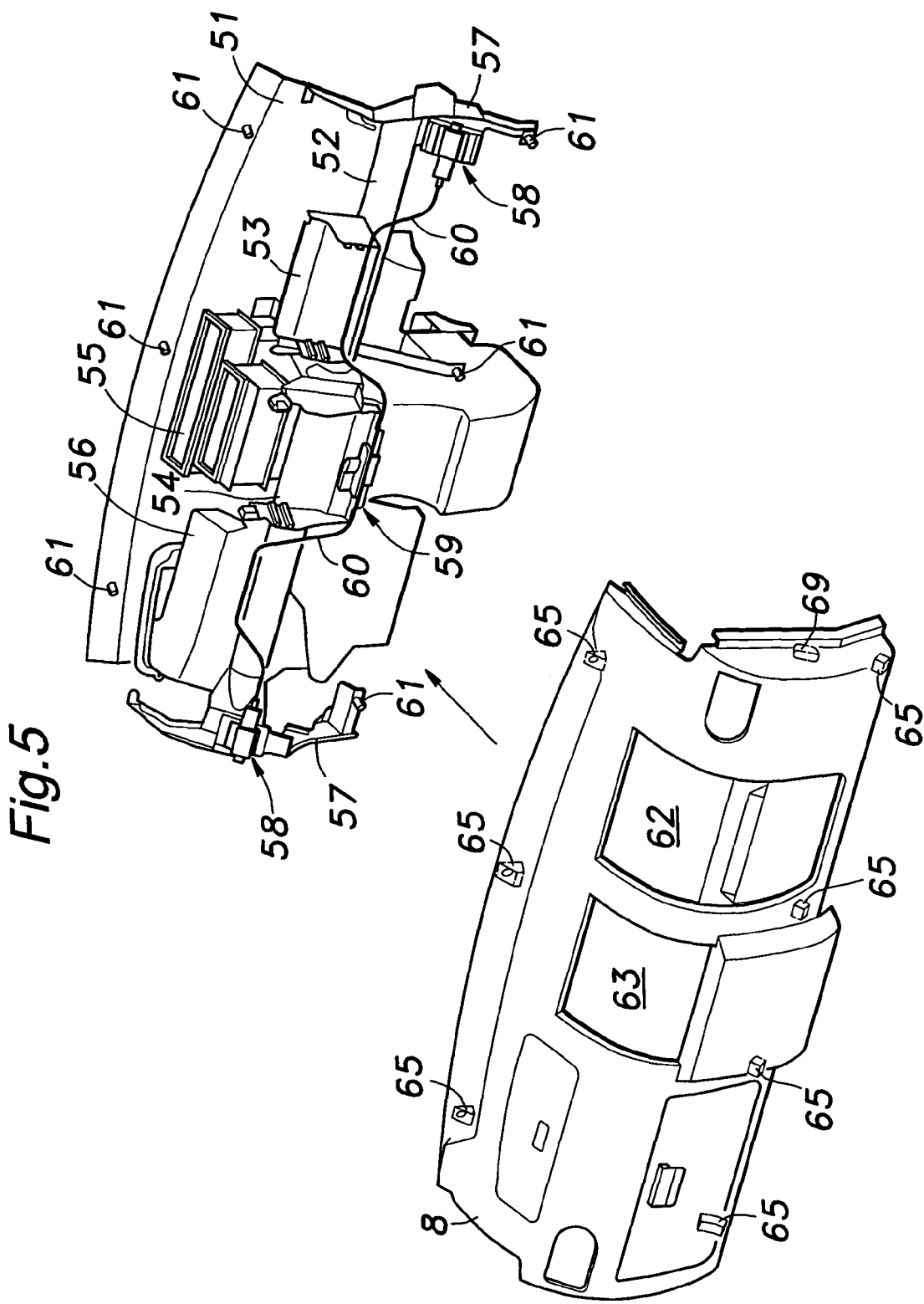
FIG. 5 is a perspective view, partly seen through, showing the relationship between the instrument panel and vehicle body.

Referring to FIG. 5, the instrument panel 8 is placed on the vehicle body 7 above the dashboard 51. Opposite to the upper surface of the dashboard 51 is provided a front beam 52 that extends between the inner surfaces of front side panel inners (not shown in the drawing). To the front beam 52 are fixedly secured an instrument panel support bracket 53, a control panel support bracket 54, an air conditioner duct 55 and an air bag system 56 for the passenger seat. The front side panel inners connected to either lateral ends of the front beam 52 are provided with connecting brackets 57 which are in turn provided with lock mechanisms 58 for fixedly securing the instrument panel 8. The control panel support bracket 54 fixedly attached to a middle part of the front beam 52 is provided with an operation handle 59 for actuating the lock mechanisms 58. The operation handle 59 is connected to each lock mechanism 58 via a Bowden cable 60 serving as a member for transmitting force.

A plurality of locator pins 61 are provided in suitable parts of the upper part of the dashboard 51 and members attached to the front beam 52 for positioning the instrument panel 8.

After the instrument panel 8 is removed, those members that are integral with the vehicle body 7 are subjected to the melting process together with the vehicle body The instrument panel 8 is entirely made of an integrally molded single-piece member, and is provided with a mounting opening 62 for a meter panel on the right hand side thereof and another mounting opening 63 for an audio unit 14 and a control panel for the air conditioner in the middle part thereof. The back side of the instrument panel 8 that opposes the dashboard 51 is provided with bosses 65 each formed with a hole for receiving the corresponding locator pin 61.

Figure 6:
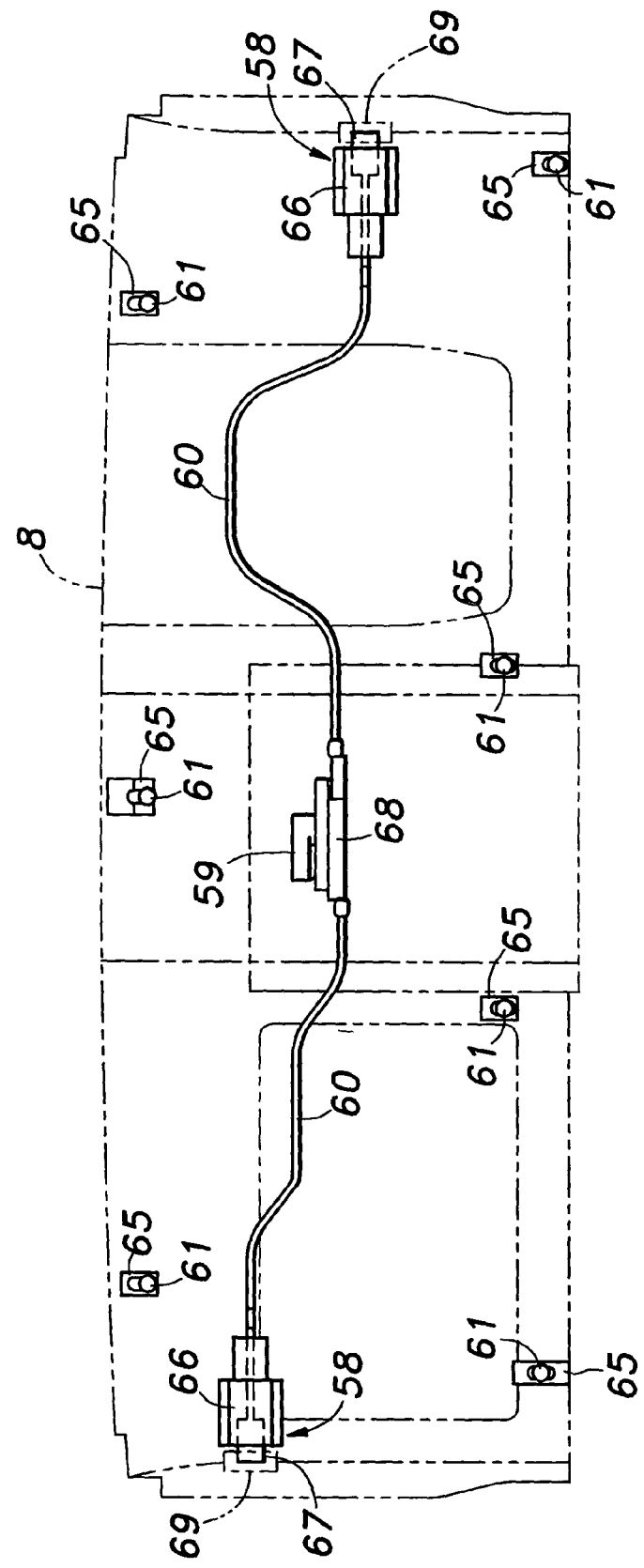
FIG. 6 is a layout view of the lock device arrangement for the instrument panel.
Figure 7:
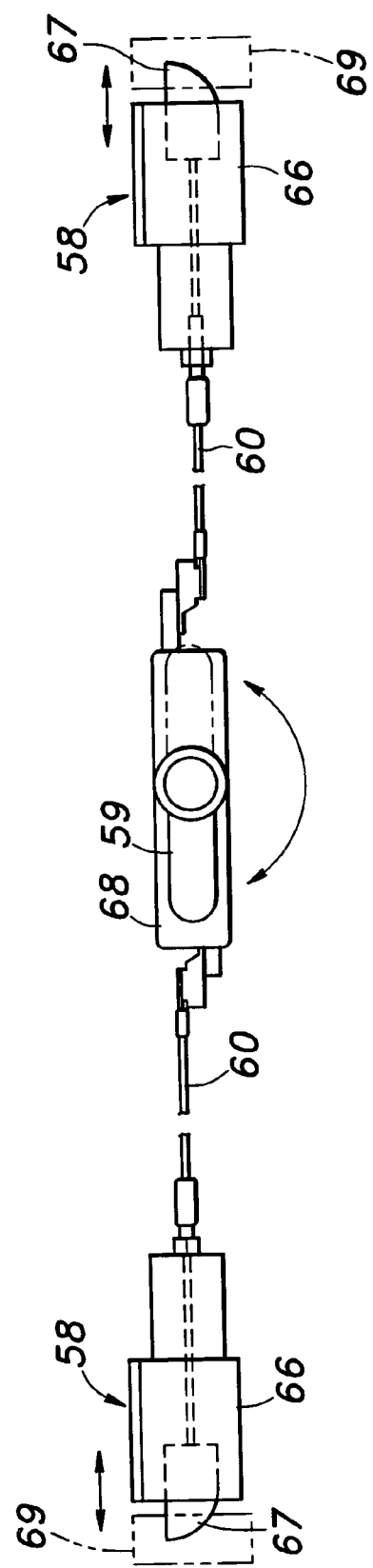
FIG. 7 is a view showing the structure of the lock device for the instrument panel.

Referring to FIGS. 6 and 7, each lock mechanism 58 consists of a holder 66 fixedly attached to the corresponding end of the front beam 52 and a latch 67 received in the holder 66 so as to be slidable laterally with respect to the vehicle body. The operating handle 59 is incorporated with a rotation/linear motion converting mechanism 68 using an eccentric cam or the like. By turning the operating handle 59, the Bowden cable 60 extending from each side of the rotation/linear motion converting mechanism 68 is actuated in both pushing and pulling directions according to the rotational direction of the operation handle 59, and the transmitted force causes the front end of the latch 67 to project out of and retract into the holder 66.

When installing the instrument panel 8 constructed as described above onto the dashboard 51 (vehicle body 7), with the operation handle 59 turned to the locking position, the dashboard 51 is pushed against the instrument panel 8. This causes the locating pins 61 provided on the dashboard 51 to fit into the holes of the bosses 65 provided on the back side of the instrument panel 8, and the instrument panel 8 is properly positioned with respect to the dashboard 51.

As the instrument panel 8 is pushed even further, edges of receiving portions 69 provided on the back side of the instrument panel 8 push the tapered front ends of the latches 67, thereby causing the latches 67 to retract. Once the front ends of the latches 67 are received in the receiving portions 69, the latches 67 are prevented from retracting and the locked state is maintained unless the operating handle 59 is turned in the unlocking direction and the Bowden cables 60 are pulled.

Once the instrument panel 8 is fixedly attached to the dashboard 51, the central mounting opening 63 for gaining access to the operating handle 59 is closed by the audio unit 14 or the like in its installed state. Therefore, the unlocking operation is not possible under normal condition.

Figure 8:
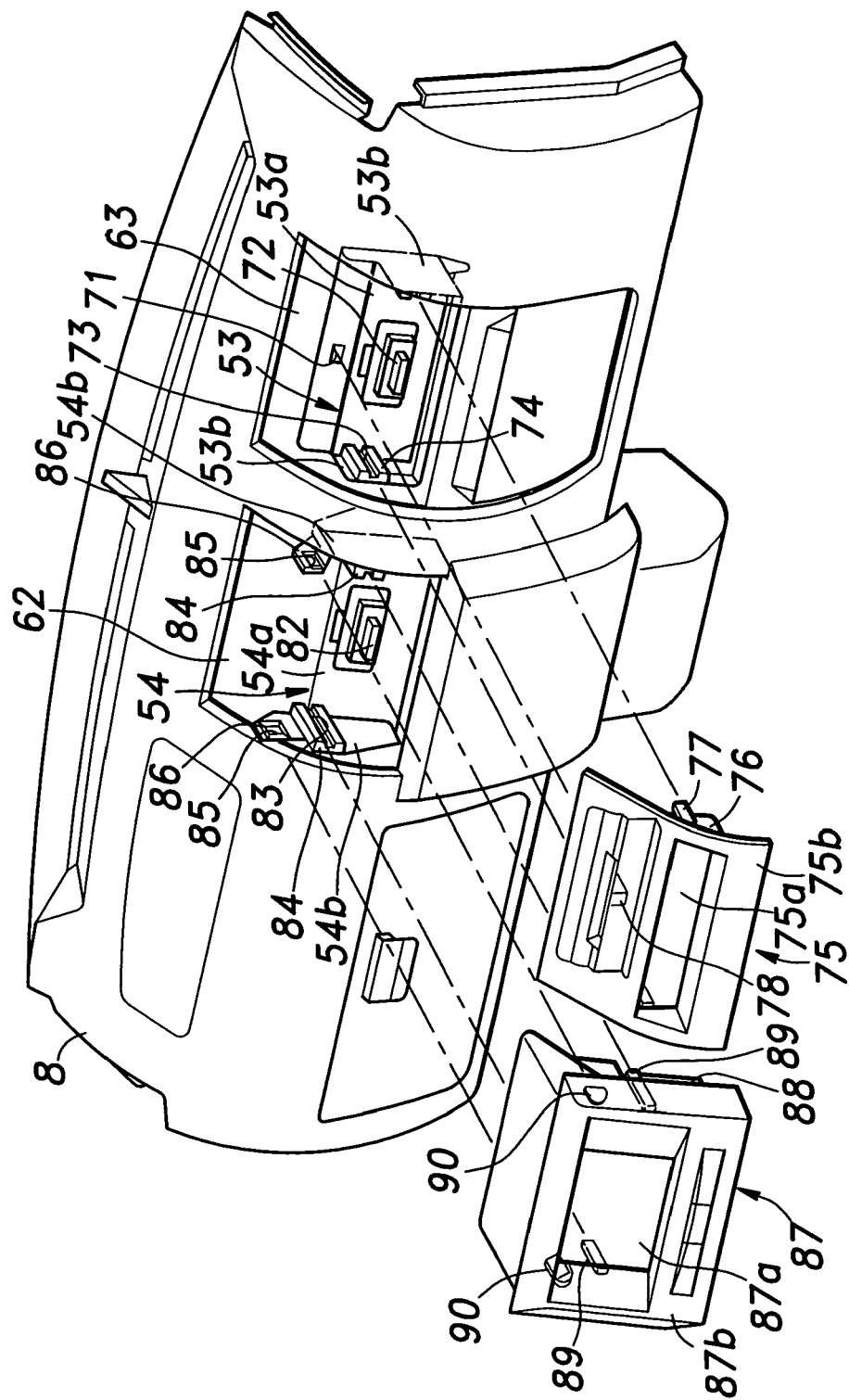
FIG. 8 is a perspective view, partly seen through, showing the instrument panel and related parts.

Referring to FIG. 8, when the instrument panel 8 is fixedly attached to the dashboard 51, the control panel support bracket 54 and meter panel support bracket 53 are located inside the mounting hole 62 formed on the right hand side of the instrument panel 8 and the mounting hole 63 formed in the middle part of the instrument panel 8, respectively.

The meter panel support bracket 53 comprises a front wall 53a on the front side with respect to the vehicle body and a pair of side walls 53b. The middle part of the front wall 53a is provided with a striker opening 71 for engaging a latch mechanism which is described hereinafter and a connector 72 for connecting signal lines, one above the other. To the inner side of each side wall 53b is fixedly attached a guide member 74 provided with a groove 73 extending in the fore-and-aft direction.

The meter panel 75 comprises a liquid crystal display 75a, a cover 75b and a frame 76. To either side of the frame 76 are fixedly attached a pair of key members 77 extending in the fore-and-aft direction so as to correspond to the grooves 73 of the guide members 74 provided in the support bracket 53. The upper surface of the frame 76 is provided with a latch mechanism 78 which is adapted to engage the striker opening 71 provided in the support bracket 53.

Figure 9:
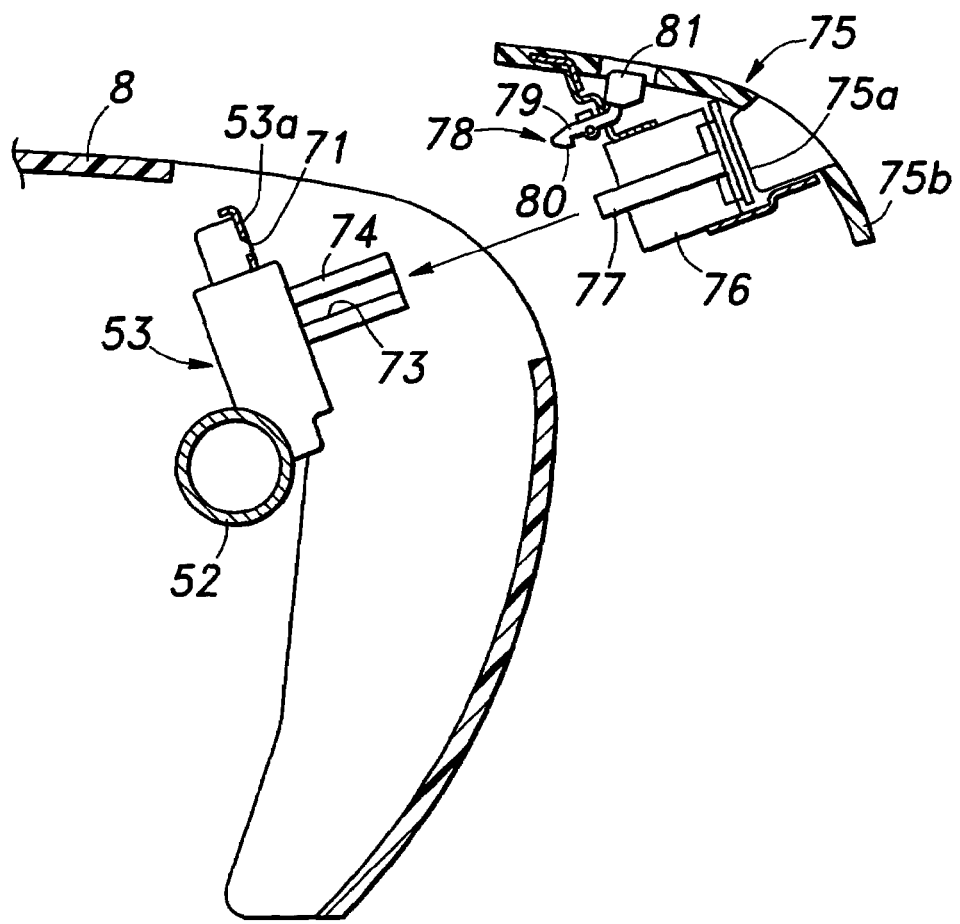
FIG. 9 is a side view of the lock device for the instrument panel and related parts.
Figure 10:
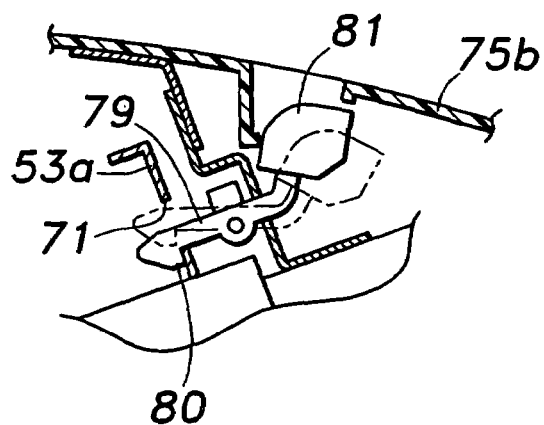
FIG. 10 is a fragmentary side view of the lock device for the instrument panel and related parts.

Referring to FIGS. 9 and 10, the latch mechanism 78 of the meter panel is provided with a lever member 79 having an intermediate part thereof pivotally supported by a laterally extending shaft so as to be tiltable like a see-saw. The front end of the lever member 79 is provided with a claw 80 adapted to fit into and engaged by the striker opening 71, and the rear end of the lever member 79 is provided with an operation knob 81. The lever member 79 is normally urged by a torsion coil spring or the like in the direction to raise the end of the operation knob 81 or in the direction to engage the claw 80 with the striker opening 71.

The control panel support bracket 54 comprises a front wall 54a on the front side with respect to the vehicle body and a pair of side walls 54b. The middle part of the front wall 54a is provided with a connector 82 for connecting signal lines. To the inner side of each side wall 54b is fixedly attached a guide member 84 provided with a groove 83 extending in the fore-and-aft direction and a striker member 86 having a striker opening 85 formed therein, one above the other.

The control panel 87 comprises a liquid crystal display 87a, a cover 87b and a frame 88. To either side of the frame 88 are fixedly attached a pair of key members 89 extending in the fore-and-aft direction so as to correspond to the groove 83 of the guide member 84 provided in the support bracket 54. The upper part of the frame 88 is provided with a latch mechanism 90 on each side thereof which is adapted to engage a striker opening 85 of a striker member 86 provided in the corresponding side of the support bracket 53.

Figure 11:
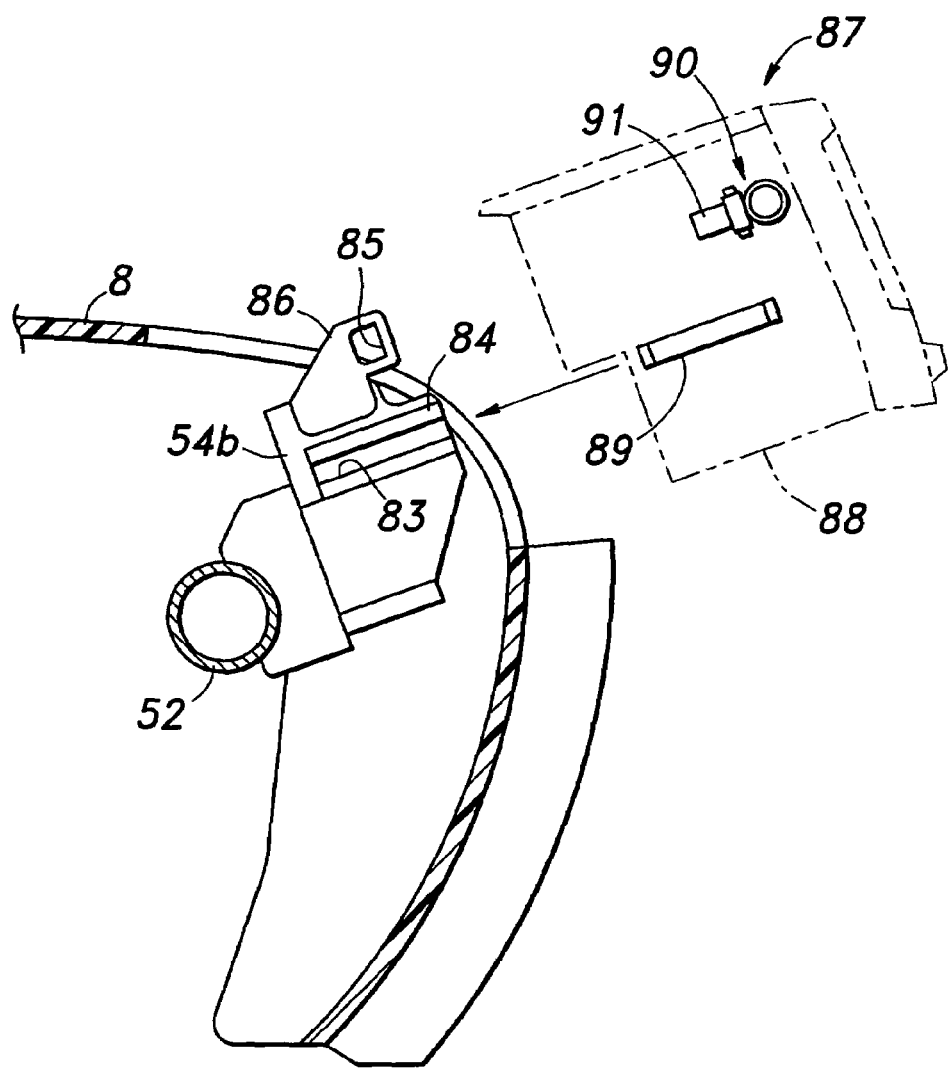
FIG. 11 is a side view of the lock device for the control panel and related parts.
Figure 12:
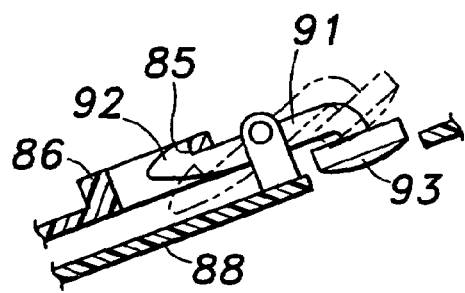
FIG. 12 is a fragmentary plan view of the lock device for the control panel and related parts.
Figure 13:
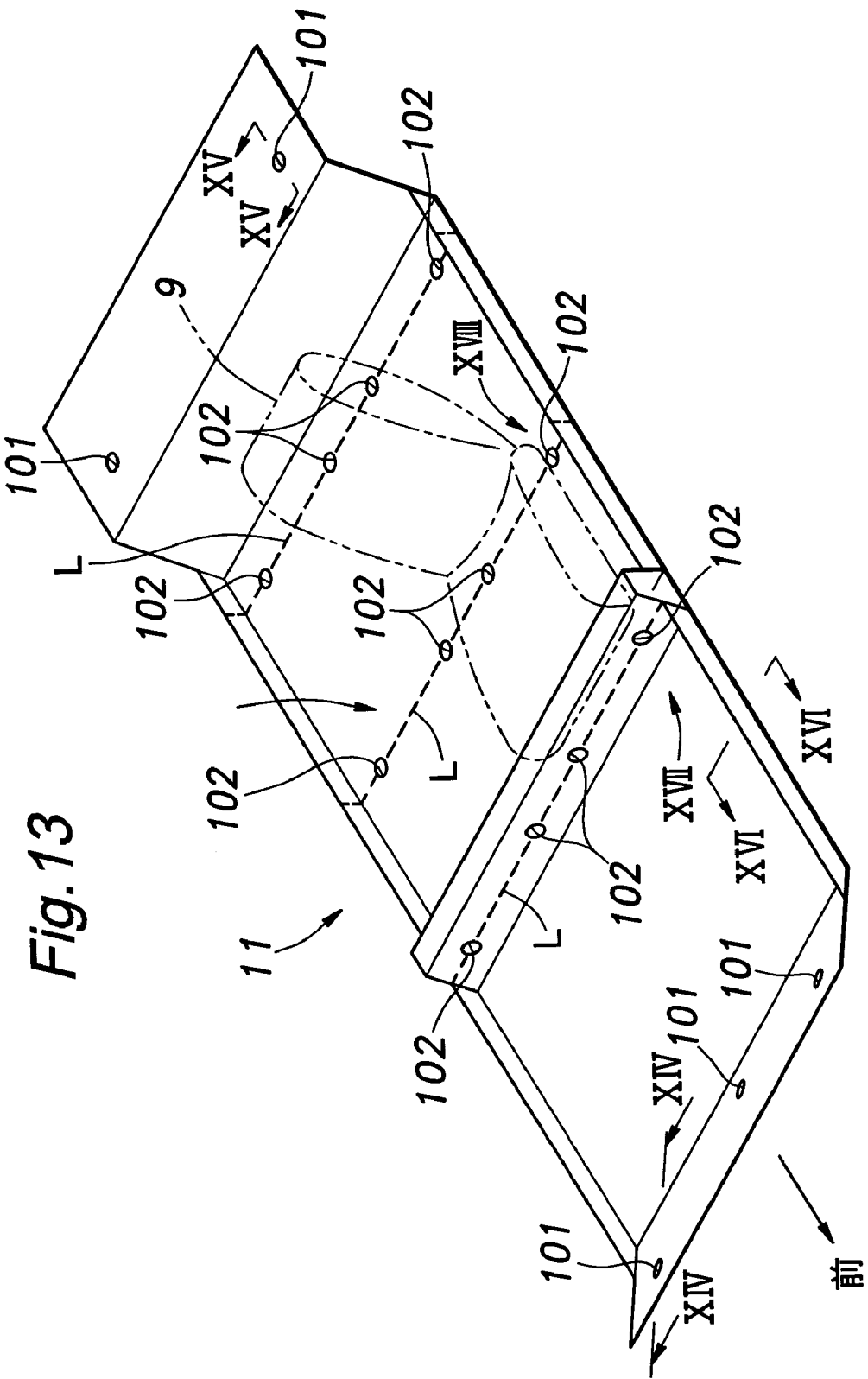
FIG. 13 is an overall perspective view of the floor mat.

Referring to FIGS. 11 and 12, the latch mechanism 90 of the control panel 87 is provided with a lever member 91 having an intermediate part thereof pivotally supported by a laterally extending shaft so as to be tiltable. The front end of the lever member 91 is provided with a claw 92 adapted to be engaged by the striker opening 85, and the rear end of the lever member 91 is provided with an operation knob 93. The lever member 93 is normally urged by a torsion coil spring or the like in the direction to urge the end of the operation knob 93 outward or in the direction to engage the claw 92 with the striker opening 85.

The meter panel 75 and control panel 87 are attached to the corresponding support brackets 53 and 54 both from outside the instrument panel 8. When mounting each of these panels on the corresponding support bracket 53 or 54, the front end of the key member 77 or 89 is aligned with the rear end of the groove 73 or 83 of the corresponding guide member 74 or 84, and is then pushed forward until the claw 80 or 92 of the lever member 79 or 91 fits into the corresponding striker opening 71 or 85. Because the lever member 79 or 91 is biased by the spring, the claw 80 or 92 is engaged by the peripheral edge of the striker opening 71 or 85 so that the meter panel 75 or the control panel 87, as the case may be, is fixedly attached to the corresponding support bracket 53 or 54. At the same time, the plug (not shown in the drawing) provided on the backside of each of the meter panel 75 and control panel 87 fits into the corresponding connector 72 or 82 so that the required electric connection is established.

When removing the meter panel 75 or the control panel 87 from the corresponding bracket 63 or 54, the operation knob 81 or 93 of the corresponding lever member 79 or 91 urged in the locking direction is pushed downward in the case of the meter panel 75 or inward in the case of the control panel 87 so that the claw 80 or 92 is disengaged from the corresponding striker opening 71 or 85 and the meter panel 75 or the control panel 87, as the case may be, is allowed to be pulled rearward in this state.

An embodiment related to the floor mat 11 is described in the following with reference to FIGS. 13 to 19. The floor mat 11 is contoured so as to conform to the irregular shape of the vehicle body floor not shown in the drawing, and is provided with fastener receiving holes 101 for securing the floor mat 11 to the vehicle body floor with plastic fasteners and threaded bolt receiving holes 102 for passing threaded bolts for securing the seats 9 (only one of the front seats is shown in the drawing) to the floor.

Figure 14:
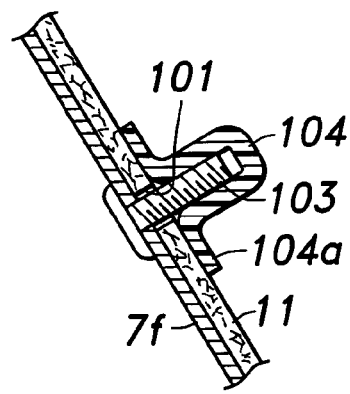
FIG. 14 is a fragmentary sectional view taken along line XIV—XIV of FIG. 13.

Referring to FIG. 14, stud bolts 103 are fixedly attached to the vehicle body floor 7f. The front part of the floor mat 11 is positioned with respect to the vehicle body floor 7f by passing these stud bolts 103 through the fastener receiving holes 101 in the front part of the floor mart 11. A plastic flanged cap 104 or the like is fitted onto each of the stud bolts 103. The front part of the floor mat 11 is therefore interposed between the flanges 104a of the flanged caps 104 and the vehicle body floor 7f and the screw thread of each stud bolt 103 engages the inner circumferential surface of the corresponding flanged cap 104 so that the front part of the floor mat 11 is fixedly secured to the vehicle body floor 7f.

Figure 15:
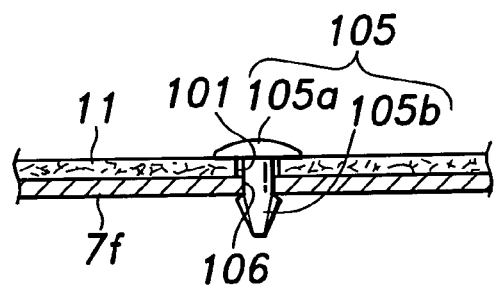
FIG. 15 is a fragmentary sectional view taken along line XV—XV.

Referring to FIG. 15, the rear part of the floor mat 11 is fixedly attached to the vehicle body floor 7f by passing a leg portion 105b of a plastic clip 105 having an enlarged head 105a through each of the fastener receiving holes 101 and resiliently forcing it into a corresponding through hole 106 provided in the vehicle body floor 7f.

Figure 16:
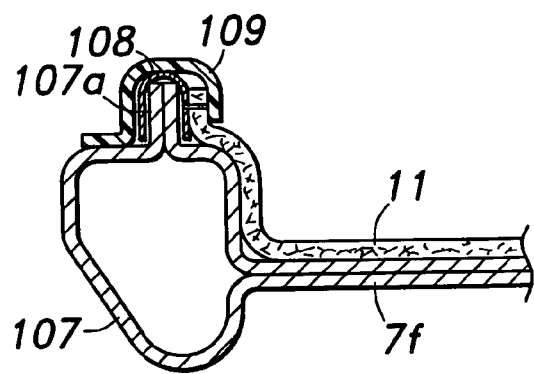
FIG. 16 is a fragmentary sectional view taken along line XVI—XVI.

Referring to FIG. 16, each side fringe of the floor mat 11 is contoured so as to conform to the cross sectional shape of the passenger compartment side of the corresponding side sill 107, and is retained thereat by engaging hooks 108 tacked to the upper end of an upright portion of the floor mat 11 with mating flanges 107a extending upright from the upper end of the side sill 107. The part of the floor mat 11 thus engaged to the side sill 107 is covered by a plastic garnish 109.

Figure 17:
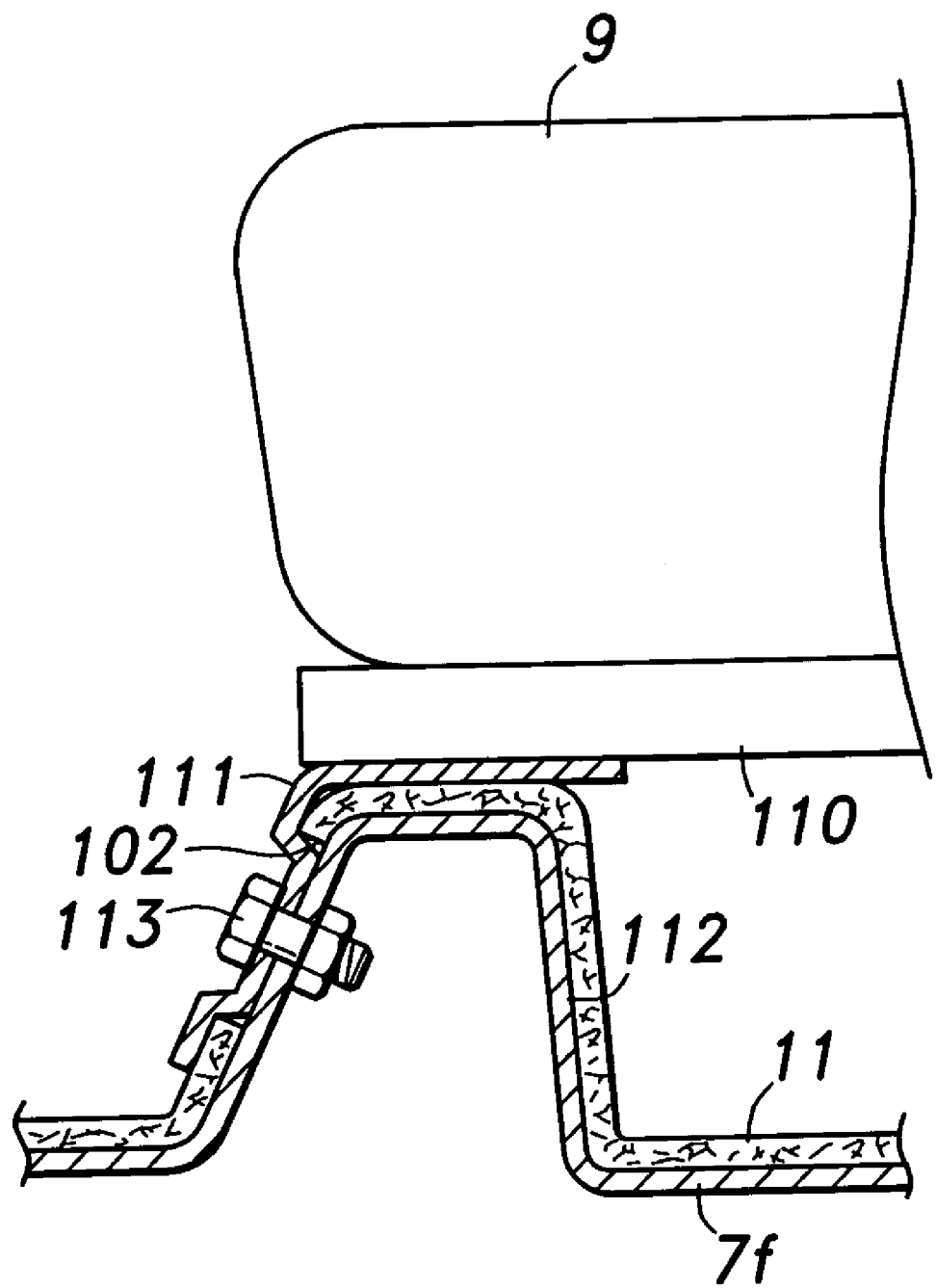
FIG. 17 is a fragmentary sectional view of part XVII.
Figure 18:
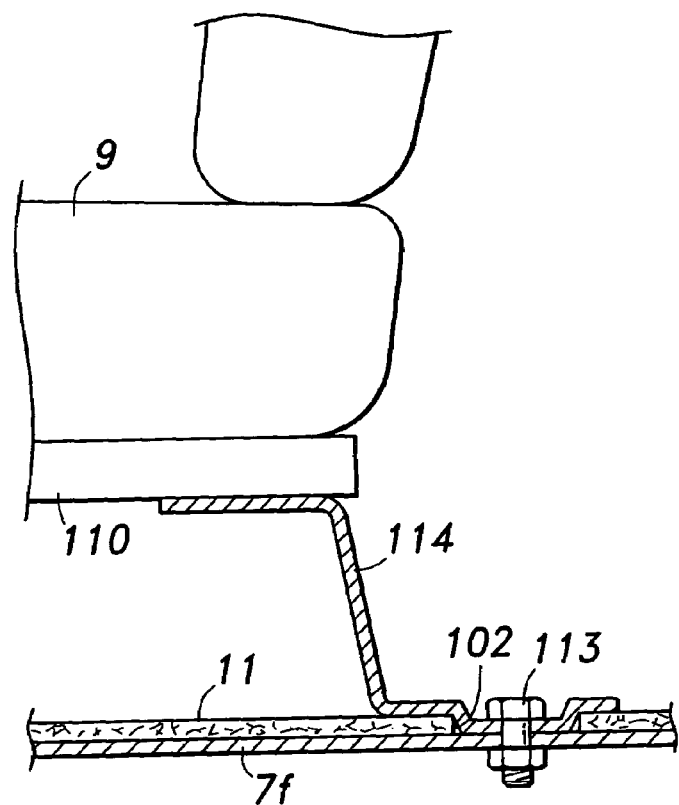
FIG. 18 is a fragmentary sectional view of part XVIII.

Referring to FIGS. 17 and 18, front and rear parts of each of the seats 9 (front seats) are attached to the vehicle body floor 7f via seat rails 110. Each seat rail 110 is fixedly attached to the bottom surface of the corresponding seat 9 in such a manner that a front bracket 111 provided in the front end thereof is fixedly attached to a cross member 112 integrally formed with the vehicle body floor 7f with threaded bolts 113, and a rear bracket 114 formed in the rear end thereof is fixedly attached to the vehicle body floor 7f with threaded bolts 113.

The mounting positions of the threaded bolts 113 for attaching the brackets to the cross member 112 of the vehicle body 7f are arranged along a straight line extending laterally across the vehicle body. The threaded bolt receiving holes 102 formed in the floor mat 11 are located so as to correspond to the threaded bolts 113 for attaching the brackets. Thus, these threaded bolt receiving holes 102 are also arranged along the same straight line L extending laterally across the vehicle body.

Figure 19:
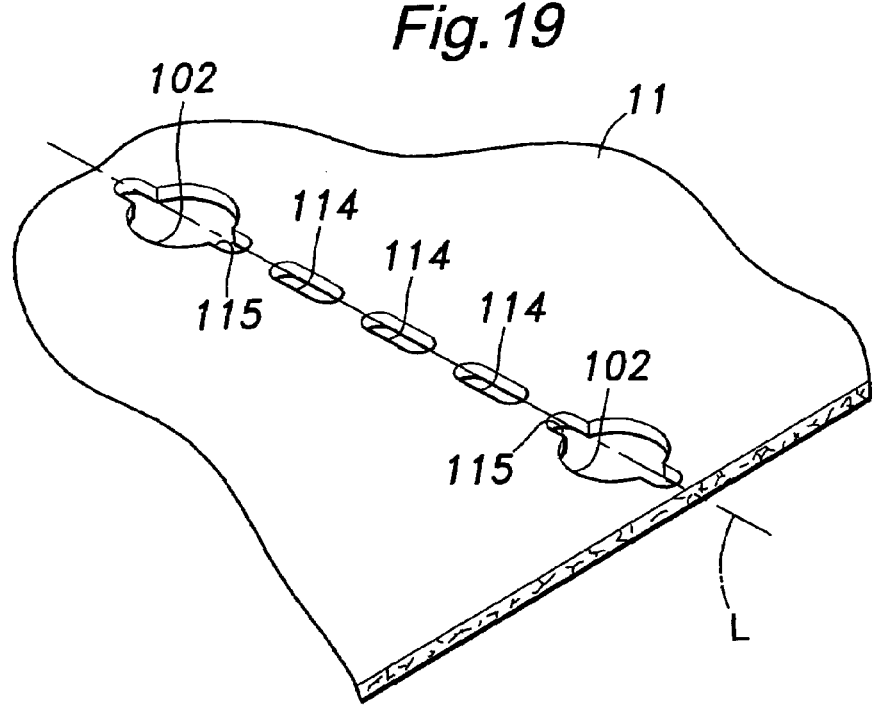
FIG. 19 is a fragmentary perspective view of the floor mat.

Referring to FIG. 19, a plurality of slots 114 each having a prescribed length are arranged along the straight line L on which the threaded bolt receiving holes 102 of the floor mat 111 are formed. The threaded bolt receiving holes 102 and adjoining slots 114 are arranged in such a manner as to define a broken line along the straight line L. Therefore, the floor mat 11 can be easily torn apart along the straight line L. Also, the threaded bolt receiving holes 102 may be provided with a notch 115 so that stress concentration may occur in this part, and the dismantling work may be even further facilitated.

According to the illustrated embodiment, because three parting lines L are defined by the threaded bolt receiving holes 102 and slots 114, when dismantling the vehicle body, after removing the fasteners attaching the floor mat 11 to the vehicle body floor 7f, with the seats 9 still left mounted, the floor mat 11 can be separated into four parts by tearing the floor mat 11 along the parting lines L. Therefore, without requiring the seats 9 to be removed, the floor mart 11 can be easily torn away from the vehicle body floor 7f.

Figure 20:
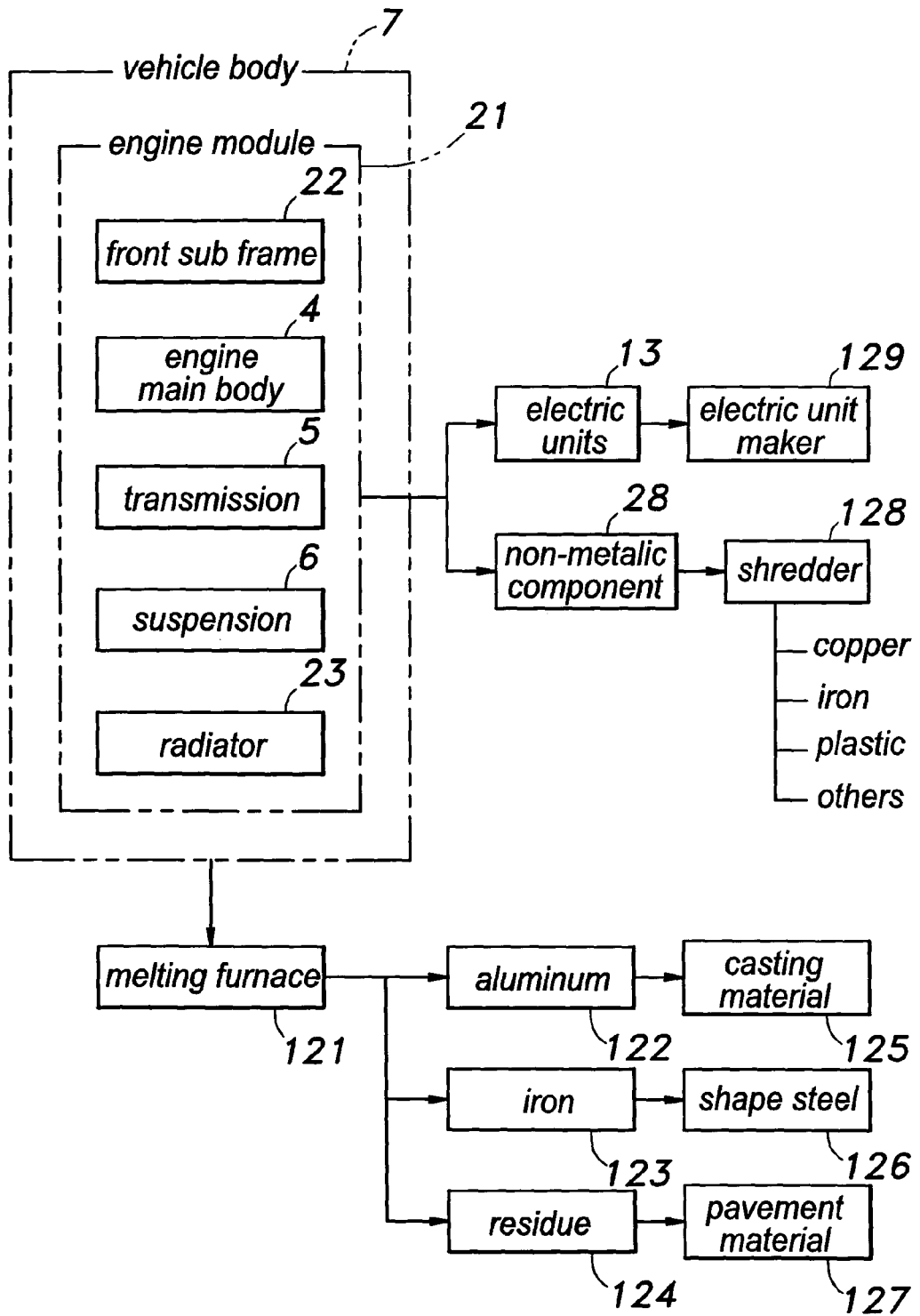
FIG. 20 is a block diagram for the engine module.
Figure 21:
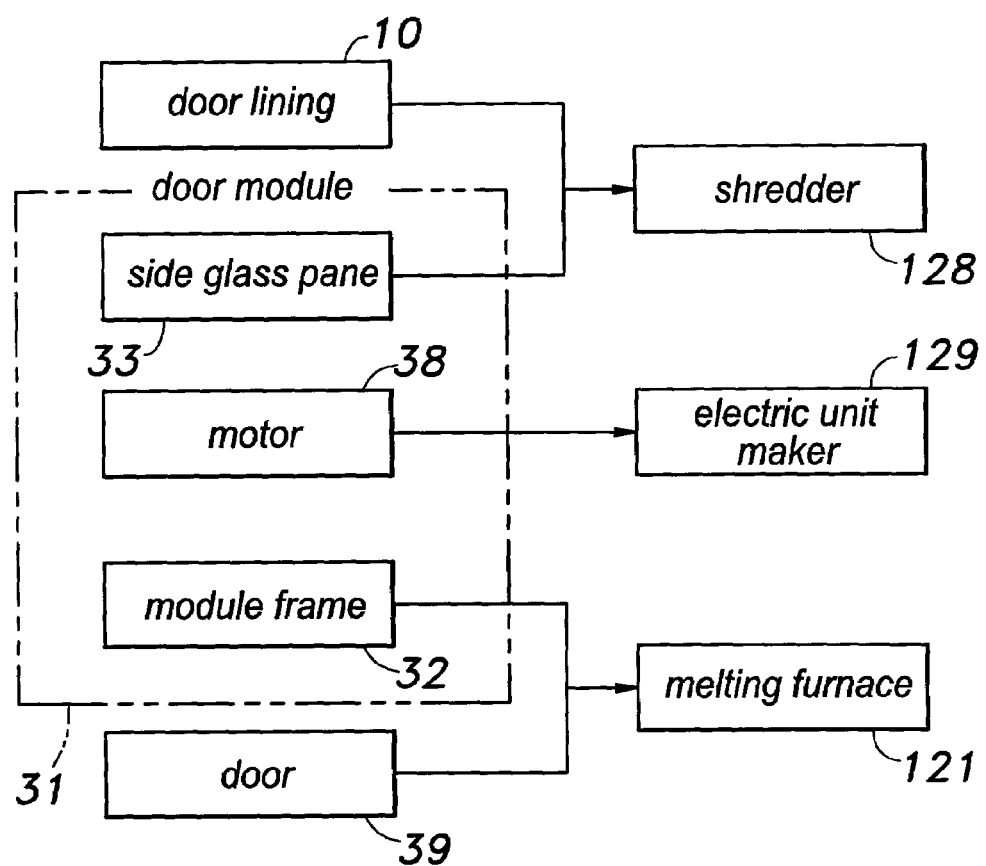
FIG. 21 is a block diagram for the door module.
Figure 22:
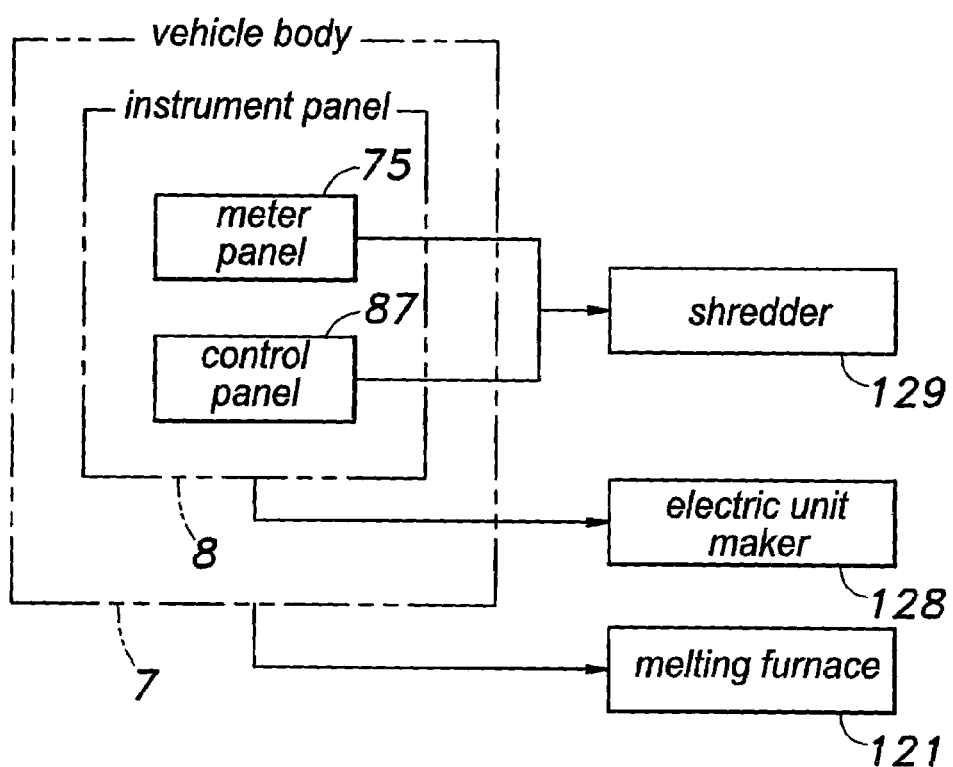
FIG. 22 is a block diagram for the instrument panel.

The process of dismantling an automobile given as an example of the device designed and manufactured according to the present invention is described in the following with reference to FIGS. 20 to 22.

Liquids such as fuel, lubricant, air conditioner refrigerant and coolant are recovered from the vehicle, and the engine module 21, door modules 31, instrument panel 8 and seats 9 are removed from the vehicle body 7 by releasing fasteners or the like.

The engine module 21 is charged into a melting furnace 121 after non-metallic components such as the electric components 13, air cleaner 25 and hoses 27 are removed therefrom. The door modules 31 are also charged into the melting furnace 121 after the side glass panes 33 and window regulator motors 38 are removed. The meter panel 75 and control panel 87 are removed from the instrument panel 8, and the instrument panel 8 is then removed from the dashboard 51. The removed instrument panel 8 is charged into a shredder 128.

After all the component parts and accessories are removed, the vehicle body 7 is pressed, and is charged into the melting furnace 121, along with the metallic components of the engine module 21 and door modules 31, so as to be eventually separated into aluminum 122, iron 123 and residue 124. The aluminum 122 is refined further, and used as the material 125 for casting engine blocks. The iron 124 is recycled by steel makers as the material for concrete reinforcing steel and shape steel. The residues containing inorganic substances are recycled by mixing them with bricks and pavement material 127.

The components such as the dashboard 51 that are essentially made of plastic material and may include thin pieces of metal are, along with glass, charged into the shredder 128 and shredded into small pieces. The obtained small pieces are separated into different materials by using known means such as centrifugal force, wind force or magnetic force, and delivered to corresponding material supplies.

The engine module 21, door modules 31 and electric components including the meters 15, audio unit 14 and window regulator motors 38 are processed by electric component makers 129. Those that can be overhauled are utilized as spare parts, and the remaining units are processed for recycling the material. Even when the electric appliances and other forms of onboard electric equipment are composed of materials of different kinds, if they are designed and manufactured according to the present invention, the processing by the electric component makers 129 can be simplified.

INDUSTRIAL APPLICABILITY

By selecting the various materials that make up each particular device according to the anticipated processes for disposing them, mounting a plurality of components onto a common base as an independent module, and adapting the various components destined for different disposing processes to be readily separated from each other, the materials which conventionally involved serious difficulties in separating and recycling are allowed to be recycled, and metals can be recycled as high quality materials. In particular, by using a common material for associated parts as much as possible, and integrating various members made of a common material or materials that are suited to be disposed by a same process into an independent module, a simultaneous disposal of such components becomes possible. Therefore, what was previously considered as waste material which is fit only for landfill can now be used as a useful resource. Therefore, the amount of waste can be minimized, and the present invention provides a high level of industrial utility.

The invention claimed is:

1. A method of designing a motor vehicle comprising a plurality of components, the method of comprising the steps of:

determining a disposing process for each component of the motor vehicle, the disposing process. being selectable from a melting process in the case of essentially metallic components including an engine, a transmission, wheel suspension systems and a vehicle body, a shredding process in the case of components made of plastic and thin pieces of metal including an instrument panel, seats, linings, floor mats and bumpers and a renovation process in the case of accessory units including electric units, audio units and meters;

selecting the material for individual components such that components that are to be disposed jointly consist of a single material;

forming a module with a plurality of components so as to allow the components to be removed from the vehicle body simultaneously as a single module and separate the components from the module outside the vehicle body; and designing connecting parts for joining the module to the vehicle body and for joining two components of the motor vehicle, said components having been determined to be disposed by different disposing processes in the determining step, so as to allow the module to be easily separated from the vehicle body and said two components from each other, wherein the motor vehicle comprises a sub frame disposed in an engine room and having an engine, a transmission, wheel suspension systems and a radiator mounted thereon, the sub frame being attached to a vehicle body via an easily detachable fastener so that the engine and other components may be simultaneously detached from the vehicle body by detaching the sub frame from the vehicle body.

* * * * *